United States Patent Office 2,904,427
Patented Sept. 15, 1959

2,904,427
PRODUCTION OF REFRACTORY METALS

Frank E. Edlin, Wilmington, Del., assignor to E. I. du Pont de Nemours and Company, Wilmington, Del., a corporation of Delaware No Drawing. Application December 21, 1955
Serial No. 554,414

8 Claims. (Cl. 75—84)

This invention pertains to an improvement in the manufacture of pure refractory metals such as titanium, zirconium, vanadium, niobium, chromium, and hafnium.

One of the most widely used processes for the production of refractory metals is by the reduction of the metal halide. Various reducing agents have been used with major emphasis being placed on magnesium and sodium metals. In this process, the halide of the reducing metal is formed, and the refractory metal is obtained as a sponge which is essentially an interlocked mass of crystals of fairly small size. The reaction mixture will contain, in addition to the by-product salt or salts, excess reductant metals and various halides of the metal produced. The major portion of these products and by-products can be removed from the refractory metal by conventional separation means, such as decantation, draining or screening. However, it is impossible to completely remove all the undesirable materials in this manner, especially the halide salt of the reducing metal. One of the methods for removing these halide salts is by leaching the sponge metal in an aqueous medium; e.g., a dilute nitric acid solution. This procedure, however, has objectionable limitations. The metal becomes contaminated with oxygen, nitrogen and hydrogen during contact with the aqueous leaching medium, and these impurities cause the metal to become hard and non-ductile.

It has been found that the amount of oxygen, nitrogen and hydrogen contamination encountered in the leaching is adversely influenced by the surface area per unit of mass of the crystals making up the sponge. If the surface area of the sponge is kept at a minimum (preferably less than .1 square meter per gram for titanium) it is possible to use a leaching step and obtain the desired metal in commercial quality. Surface area determinations are discussed by Emmett in "Industrial Engineering Chemistry," vol. 37, p. 639 (1945).

It is an object of this invention to provide a speedy process for reducing the surface area of sponge refractory metals, particularly titanium, zirconium and hafnium with a minimum of impurities. It is a further object of the invention to produce these metals in a commercially usable form.

These objects are accomplished by suspending particles of the metal in a molten salt, placing the suspension in a high frequency electromagnetic field and heating only the metal to a temperature of at least 1100° C., removing the suspension from said high frequency field and recovering the refractory metal. The energy transmitted during the process can be applied so that it is nearly all absorbed by the metal particles, and as a result they are very rapidly heated while there is little temperature change in the salt. Obviously, some of the heat from the metal is transferred to the salt, but the suspension is not allowed to remain in the electromagnetic field a sufficient time to have the heat transfer approaching equilibrium. A most convenient method for placing the suspension into and removing it from the electromagnetic field is by simply allowing the material to flow through a non-metal conduit which is located in the field at a velocity sufficient to maintain the suspension. By this process it is possible to cause a 20-fold reduction in surface area in about 2 seconds, and the treated metal which is recovered can be easily purified by leaching without encountering harmful amounts of oxygen, nitrogen and hydrogen.

In a preferred embodiment, this invention comprises suspending particles of titanium sponge averaging ⅛ inch in diameter in a molten salt, such as sodium chloride, magnesium chloride or a low melting eutectic of these or other chloride salts, and then placing the suspension in an electromagnetic field of sufficiently high frequency and intensity to heat the titanium particles to temperatures ranging from about 1600° C. to about 1720° C. This temperature range extends a few degrees on either side of the melting point of titanium (1690° C.). The suspension is then removed from the field and separated from the molten salt by draining or screening. After this separation, it is leached with an aqueous medium, such as water, or preferably an aqueous acid solution, and a pure titanium metal is obtained.

The length of time in which the slurry is allowed to remain in the electromagnetic field (i.e., the hold period) will depend upon the strength of this field and the particle size of the metal, which in turn governs the temperature to which the metal is raised. In the preferred aspect of this invention, the electromagnetic field is sufficient to raise the temperature of titanium to the vicinity of its melting point (1690° C.) and the hold period may be as short as 1 or 2 seconds. Of course, a weaker field may be used, and the metal held in the field for longer periods of time. Variations of the field, the hold period and particle size to obtain a desired surface area can easily be determined. However, it is more economical to use a field which will raise the temperature of the metal to the vicinity of its melting point in the shortest possible time. For this purpose, frequencies of from 100-kc. to 5-mc. will be found to be effective. A preferred frequency range is from 450 to 530-kc. The necessary power will range from 2 to 3-kw. per square inch of the conduit wall surface and more for smaller particles and heavier suspensions. Under such a power load, the titanium particle forms an insulating layer of vapor around itself as its temperature exceeds the boiling point of the compounds in the eutectic salt bath and of the impurities within the particle. After the titanium particles have passed through the field they are almost instantaneously reduced to the salt temperature, which has increased but slightly in temperature because of the few seconds that the titanium was held above the salt temperature, and the unfavorable conditions for heat transfer due to the gas film.

The following example is intended to be illustrative of the invention, but not in limitation thereof.

Example I

Particles of titanium metal ¼ inch in diameter were suspended in a molten eutectic mixture of sodium and magnesium chloride (66% NaCl to 34% MgCl$_2$) in the ratio of 1 pound of metal to 5 pounds of salt at 750° C. This mixture was allowed to flow by gravity through a 1 inch silica tube 2 ft. long at a velocity of 1 ft. per second. Two coils of ¼ inch copper tubing, water-cooled, consisting of 12 turns each were wrapped around the silica pipe, so that each coil was about eleven inches long. Then 50-kw. of 500-kc. high frequency power was introduced to each coil, a total of 100-kw. The titanium particles were brought to their melting point in this two foot length of silica pipe in an average time of two seconds and then quenched as they passed beyond the field. The initial slurry temperature of 750° C. was increased to 910° C. by this treatment. The specific surface of the titanium fed to the system was measured as 0.4 square meter per gram metal, and after heat-treatment was found to be reduced to 0.02 square meter per gram, a 20-fold reduction in specific surface. By this procedure it is possible to treat 300 pounds of titanium per hour. After the metal was separated from the molten salt by draining, it was cooled to room temperature, in an inert atmosphere of argon and then leached with a 5% nitric acid solution until no more contaminants could be removed. The metal obtained was soft and ductile.

It is conventional in the production of refractory metals, such as titanium, to maintain an inert atmosphere when the metal is at elevated temperatures. In this invention the molten salt protects the metal from the normal atmosphere during heating. However, after removal from the molten salt and during cooling, an inert atmosphere of argon, helium, krypton or other inert gas should be maintained. The temperature at which the metal can be removed from the inert atmosphere will vary with the metal being treated, the impurities present, the specific surface area of the metal, and the particle size of said metal. The presence of fines, of course, reduces this temperature. It is preferred to reduce the temperature of the metal particles to atmospheric temperatures before removing them from the inert atmosphere. However, the particles may be removed at higher temperatures if one first determines the maximum temperature for non-reactivity under the particular operating conditions.

While the invention has been illustrated with respect to a system which is adaptable to a continuous process, it should also be pointed out that the molten suspension could be placed in a vessel and the vessel placed in the electromagnetic field or a suitably designed electromagnetic coil could be submerged within a metallic or non-metallic vessel of appropriate size and shape. However, passing the material through a conduit offers distinct advantages from the standpoint of time, convenience and economy. Although silica conduit has been used in the example, other non-metallic pipes which would not be affected by the electromagnetic field may be used, such as zirconia, silicon carbide, or titanium nitride. The metal concentration in the molten salt may be varied substantially. Preferred suspensions contain from three to seven lbs. of salt for each lb. of metal. Other metal salts, such as potassium chloride and calcium chloride which are unreactive with the refractory metal and are not objectionable in trace amounts not removed by leaching or other purification step, are also suitable. The use of sodium or magnesium chloride is preferred, since these salts are conventional by-products of the reduction reaction, and their use eliminates the necessity of subsequently removing an additional material. The leaching of titanium is a conventional step, and for a discussion of the process, reference is made to pages 16 and 17 of R.I. 4519 published by the Bureau of Mines.

The invention has been specifically described in respect to titanium, merely for convenience of expression and it should be understood that zirconium, vanadium, niobium, chromium, and hafnium and other refractory metals of Groups IV, V, and VI of the Periodic System originating with Mendeleeff may be treated in the same manner.

One of the advantages of this invention is a high rate of energy transfer per unit volume of sponge. It is possible for example, to inductively couple on the order of 50 to 100-kw. of power into a receptor volume of several cubic inches. Particles of metal sponge placed in a field of this intensity will be heated to the melting point in less than 2 seconds thus resulting in a very high speed process utilizing small, simple equipment. Another advantage is that this invention heats the metal without appreciably heating other materials or apparatus in the system. It will be seen in Example I it is possible to raise the temperature of the titanium to the melting point (1690° C.) while causing only a 160° C. rise in the salt temperature. Because this process does not substantially raise the temperature of the apparatus, there is less tendency for contamination of the refractory metal by the materials used in said apparatus. This obviously allows a wider choice of construction materials.

Another advantage is that this invention is readily adaptable to a continuous process.

A further advantage is that this treatment can be accomplished without the use of an inert atmosphere such as is usually required in heating very pure metals in atmospheres of argon or helium.

It is frequently found that the center or core of a particle has been melted before or without melting the exterior surface. This has been an advantage in volatilizing the interior impurities first and consequently avoiding to a major extent the entrapment of these impurities by the outer surface.

Another advantage is that very fine metal particles are not heated appreciably by an electromagnetic field of a strength suitable for the average particle.

I claim:

1. A method for reducing the surface area of a sponge metal selected from the group consisting of the refractory metals of Group IV, Group V, and Group VI of the Periodic System originating with Mendeleeff, said method comprising suspending particles of said metal in a molten salt which is essentially inert to said metal, placing the suspension in a high frequency electromagnetic field and heating only the metal to a temperature of at least 1100° C., removing the suspension from said high frequency field, separating the sponge metal from the molten salt, cooling said sponge metal in an inert atmosphere to temperatures at which said metal is non-reactive with the normal atmosphere and thne recovering the treated metal.

2. The process of claim 1 in which the metal is titanium.

3. A method for reducing the surface area of a sponge metal selected from the group consisting of the refractory metals of Group IV, Group V, and Group VI of the Periodic System originating with Mendeleeff, said method comprising suspending said particles of said metal in a molten salt which is essentially inert to said metal, placing the suspension in a high frequency electromagnetic field and heating only the metal to a temperature which is at about the melting point of said metal, removing the suspension from said high frequency field, separating the sponge metal from the molten salt, cooling said sponge metal in an inert atmosphere to temperatures at which said metal is non-reactive with the normal atmosphere, and then recovering the treated metal.

4. The process of claim 3 in which the metal is titanium and the temperature range is from 1600 to 1720° C.

5. A method for reducing the surface area of a sponge metal selected from the group consisting of the refractory metals of Group IV, Group V, and Group VI of the Periodic System originating with Mendeleeff, said method comprising suspending particles of said metal in a molten salt which is essentially inert to said metal, passing the suspension through a non-metal conduit located in a high frequency electromagnetic field and heating only the metal to a temperature of at least 1100° C., removing the suspension from said high frequency field, and recovering the sponge metal.

6. The process of claim 5 in which the metal is titanium.

7. The process of claim 6 in which the molten salt is a eutectic mixture of sodium chloride and magnesium chloride.

8. A method for purifying a sponge metal selected from the group consisting of titanium, zirconium and hafnium, said method comprising suspending particles of said metal in a molten salt which is essentially inert to said metal, placing the suspension in a high frequency electromagnetic field and heating only the metal to a temperature of at least 1100° C., removing the suspension from said high frequency field, separating the sponge metal from the molten salt, cooling said sponge metal in an inert atmosphere to temperatures at which said metal is non-reactive with the normal atmosphere, leaching said cooled metal with an aqueous medium, and then recovering a purified metal.

References Cited in the file of this patent

UNITED STATES PATENTS

| | | |
|---|---|---|
| 2,732,292 | Jordan | Jan. 24, 1956 |
| 2,743,199 | Hull et al. | Apr. 24, 1956 |

UNITED STATES PATENT OFFICE
CERTIFICATE OF CORRECTION

Patent No. 2,904,427 September 15, 1959

Frank E. Edlin

It is hereby certified that error appears in the printed specification of the above numbered patent requiring correction and that the said Letters Patent should read as corrected below.

Column 4, line 35, for "thne" read — then —; lines 72 and 73, strike out "titanium, zirconium and hafnium" and insert instead — the refractory metals of Group IV, Group V, and Group VI of the Periodic System originating with Mendeleeff —.

Signed and sealed this 1st day of March 1960.

(SEAL)
Attest:

KARL H. AXLINE
Attesting Officer

ROBERT C. WATSON
Commissioner of Patents